Figures 1, 2:
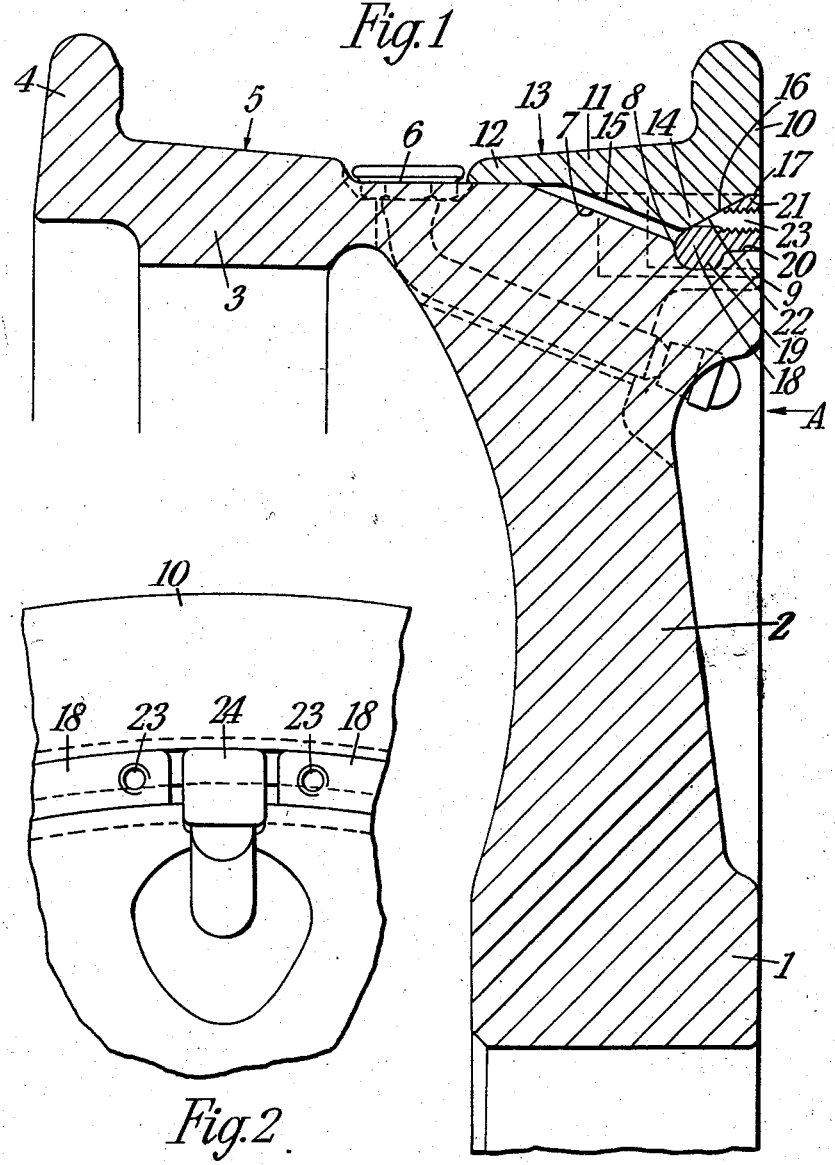

Oct. 21, 1958     H. W. TREVASKIS     2,856,980
VEHICLE WHEEL ASSEMBLY
Filed Dec. 21, 1953

INVENTOR
Henry William Trevaskis
by Benj. T. Rauber
his attorney

United States Patent Office 2,856,980
Patented Oct. 21, 1958

2,856,980
VEHICLE WHEEL ASSEMBLY

Henry William Trevaskis, Solihull, England, assignor to Dunlop Rubber Company Limited, London, England, a British company Application December 21, 1953, Serial No. 399,380

Claims priority, application Great Britain January 9, 1953

9 Claims. (Cl. 152—410)

This invention relates to a vehicle wheel assembly and more particularly relates to a detachable tire-retaining flange and locking ring for aircraft wheels.

Aircraft wheels are known comprising a tire-seating rim having a tire-retaining flange integral with one edge thereof and an annular detachable flange located on the other edge. The detachable flange is provided on its inner peripheral side with a circumferentially-extending spline which engages in a corresponding groove in the wheel rim, to prevent axial movement of the flange relative to the rim when the flange has been assembled in position. The flange is split into two or more segments to enable it to be fitted, and said segments are bolted together by nuts and bolts engaging in lugs carried at each end of the segments. The lugs extend axially away from the flange and stand proud of the side of the wheel. The effective width of the wheel is thereby increased and this is objectional when fitted to certain types of aircraft, where the space available for the retraction of wheels, for example, into a thin section wing, is usually very restricted.

Other types of wheels are known having an annular detachable flange slidable on the wheel rim and held in position by a split locking ring engaging with the flange and with an annular gutter formed in the wheel rim. In this type of wheel the flange is moved axially inwardly against the pressure of the tire bead to allow the split locking ring to fit axially into the gutter and this has the disadvantage that on sudden deflation of the tire, as by a quick puncture, it is possible for the flange to move inwardly and allow the locking ring to quit the gutter under the action of centrifugal force, when the flange, and probably the tire also, may disengage from the wheel rim.

My invention provides a wheel assembly, particularly for aircraft, wherein these disadvantages are overcome.

According to my invention a wheel of the type provided with a detachable flange and split locking ring comprises a rim having an annular recess adjacent one side thereof, a locking ring adapted to fit in said recess and a detachable annular tire-retaining flange having an inwardly-extending shoulder to engage with said ring and allow insertion and removal of the ring only by moving the flange inwardly of the rim and winding the ring into its recess progressively from one end thereof.

Preferably a vehicle wheel assembly of my invention comprises a wheel rim having a tire-retaining flange and bead-seating portion integral with one edge thereof, a frusto-conical portion adjacent the other edge having its smallest diameter remote from the integral flange, an annular recess at the small diameter end of said frusto-conical portion and a cylindrical portion between the recess and the other edge of the rim and an annular detachable flange comprising a bead-seating portion and a tire-retaining portion and having a shoulder of triangular section extending inwardly from the inner periphery thereof, the inner side of the shoulder being parallel to the frusto-conical portion of the rim. The assembly also comprises a split locking ring for the detachable flange of substantially triangular section having a side to fit against the cylindrical portion of the rim between the recess and the edge of the rim, a projection to fit into the recess and a side to fit against the outer side of the flange shoulder when said shoulder is spaced a small distance from the frusto-conical portion of the rim, whereby the detachable flange may be moved axially inwardly a sufficient distance only to permit the assembly or removal of the locking ring progressively around the rim.

The assembly is so arranged that the axially outward force on the detachable flange by the inflated tire wedges the flange more tightly on the locking ring, which is in turn prevented from axial movement relative to the rim by the projection thereon engaging in the annular recess in the wheel rim. A feature of the press invention is that only a limited clearance is provided between the detachable flange and rim, and this clearance is not sufficient to enable the split locking ring to be opened out and fitted in one axial movement, but insead it has to be progressively fitted around the rim, starting at one end and inserting a few inches at a time. There is thus little chance of the locking ring leaving the rim during service. Moreover, there are no projections on one side of the wheel associated with the fitting of the flange which would increase the effective width of the wheel.

The invention will now be more fully described with reference to the embodiment illustrated in the drawings, of which:

Figure 1 is a part section of a wheel assembly constructed according to the invention Figure 2 is a part view of Figure 1 in the direction of arrow A.

The wheel comprises an inner peripheral portion 1, an annular web 2 integral therewith and integral at its outer periphery with a wheel rim 3. Said web is offset to one side of the median plane of the wheel.

The rim is integrally provided, on one edge thereof, with a tire-retaining flange 4, and the rim slopes inwardly as shown at 5 from said flange 4 to a location adjacent the median plane of the wheel and is stepped inwardly at said location to a cylindrical portion 6 extending to a location on the other side of said median plane. The other edge of the rim 3 is provided with a frusto-conical portion 7 having its smaller diameter end remote from the median plane of the wheel and terminating in an annular recess 8 of substantially part-oval section. A cylindrical step 9 is provided between the recess 8 and the edge of the rim. The frusto-conical portion 7 of the rim profile commences about one-fifth of the width of the rim from the median plane thereof and finishes about one-eighth of the width of the rim from the edge remote from the integral flange 4. The width of the recess 8 and the step 9 are substantially equal. The angle of inclination of the frusto-conical portion 7 is of the order of 25°.

An annular detachable tire-retaining flange 10 is provided having a substantially axially-extending tire bead-seating portion or base 11 on one side thereof. The end of the base remote from the tire-retaining portion has a part 12 adapted to overlie the cylindrical part 6 of the rim adjacent the median plane thereof. The outer periphery of the base slopes inwardly as shown at 13 from the tire-retaining portion to the end thereof, and is symmetrical with the profile of the rim on the other side of the median plane thereof. The base 11 of the flange 10 is provided with an annular shoulder 14 of triangular section extending inwardly therefrom. One side 15 of the shoulder 14 is parallel with the frusto-conical portion 7 of the wheel rim and the other side 16 of said shoulder 14 is inclined outwardly at an angle of the order of 30° from the axis of the wheel. An axially-extending flat 17 is provided between the side of the shoulder 14 and the outer edge of the detachable flange 10.

A split locking ring 18 is provided of substantially triangular cross-section having a rounded portion 19 to engage in the annular recess 8 in the wheel rim, two parallel axially-extending portions 20, 21 to fit against the step 9 at the edge of the wheel rim and the flat 17 of the flange respectively and a sloping portion 22 to abut the outwardly inclined side 16 of the shoulder 14 on said detachable flange. The two ends of the split locking ring 18 are each provided, on the radially-extending outer side thereof, with an axially-extending tapped hole 23 into which handles may be fitted to assist in fitting or removal of the locking ring.

To mount a tire on the rim the detachable flange 10 and locking ring 18 are removed from the rim and a pneumatic tube and cover assembly are fitted thereon, one bead of the cover fitting against the integral flange 4 and said bead seating on the inwardly sloping part 5 of the rim adjacent said flange 4. The detachable flange 10 is then slid axially on to the rim, the other bead of the cover seating on the sloping portion 13 thereof and the side of the bead abutting the tire-retaining portion. The flange 10 is then forced inwardly until the side 15 of the shoulder 14 of triangular section abuts the parallel frusto-conical portion 7 of the rim profile. With the flange in this position it is possible to introduce a portion of the split locking ring 18 into the annular gap of substantially triangular section formed between the flange 10 and the rim 3. The rounded portion 19 of the locking ring fits into the recess 8 of part-oval section and prevents axial movement of said locking ring relative to the rim once said locking ring has been fitted. The locking ring is not fitted onto the rim in an axial direction, since it is not possible to move the detachable flange 10 inwardly a sufficient distance to provide a clearance for the rounded end 19 of the locking ring when it is introduced axially. Accordingly the locking ring 18 is fed progressively at an angle to the axis of the wheel, and in a direction parallel to the outer side 16 of the shoulder 14 of the detachable flange, i. e. the locking ring is initially held in a plane lying at an angle of about 30° from the median plane of the wheel and, starting from one end, the rounded portion is fed into position until the entire locking ring is in position, when the flange is allowed to slide back due to the resilience of the tire.

An advantage of this construction is that there are no projections on the side of the wheel, which can thus fit into a narrow recess when retracted. In addition a thicker and stronger detachable flange is possible, thus reducing the risk of failure in service. The tire, when inflated, wedges the abutting sloping portion 16 of the flange 14 and locking ring 18 together, thus providing a non-slip grip between the flange and locking ring. A key 24 (Figure 2) may be provided to prevent relative rotation between the wheel rim and the locking ring. Moreover, due to the fact that the flange can only move inwardly a limited distance and consequently the locking ring has to be progressively inserted and removed, it is impossible, on sudden deflation of the tire, for the locking ring to fly off the rim and allow the detachable flange, and possibly the tire also, to leave the rim.

Having described my invention, what I claim is:

1. A vehicle wheel assembly comprising a wheel rim having a tire-retaining flange and bead-seating portion integral with one edge thereof, a frusto-conical portion adjacent the other edge, having its smallest diameter remote from the integral flange, an annular recess at the smaller diameter end of said frusto-conical portion and a cylindrical portion between the recess and the other edge of the rim, an annular detachable flange comprising a bead-seating portion and a tire-retaining portion having a shoulder of triangular section extending inwardly from the inner periphery thereof, the inner side of the shoulder being parallel to the frusto-conical portion of the rim, and a split locking ring of substantially triangular section having a side fitting against the cylindrical portion of the rim, a projection fitting into the recess and a side fitting against the outer side of the flange shoulder when said shoulder is spaced a small distance from the frusto-conical portion of the rim, whereby the detachable flange may be moved axially inwardly a sufficient distance only to permit the assembly or removal of the locking ring progressively around the rim.

2. A vehicle wheel assembly according to claim 1 wherein tapped holes are provided adjacent the ends of said locking ring.

3. A wheel comprising a rim having a tire retaining flange at one side and being reduced in diameter near the opposite side and having an annular groove in said reduced diameter part spaced axially inwardly of said side, said groove having a greater axial dimension than radial dimension, a split locking ring having a radially inwardly extending bead to fit into said groove, a radially inner surface to rest on the rim between the groove and the adjacent side of the rim and an outer surface extending from the bead radially and axially outwardly to the adjacent side of the rim, and a removable tire retaining flange having a radially inward surface to abut the radially outward surface of the locking ring and extending axially in spaced relation to the reduced diameter part of the rim to permit said flange to move axially into contact with said reduced diameter part a distance insufficient to permit said split locking ring to expand radially outwardly to clear said bead from said groove but sufficient to permit said bead to clear said groove upon twisting said locking ring to permit progressive radial and axial withdrawal of said locking ring.

4. The wheel of claim 3 in which the outer peripheral surface of said rim tapers axially outwardly and radially inwardly to said groove and the opposing surface of said removable tire retaining flange is parallel thereto.

5. The wheel of claim 4 in which the annular bottom edges of said groove are rounded and the bead of the split locking ring fits said edges of said groove.

6. The wheel of claim 4 in which the inner surface of said removable tire retaining flange is tapered radially outwardly toward the axially outer side of the flange and in which the outer surface of the ring is of complementary taper.

7. A wheel according to claim 3 wherein the radial extending clearance between said detachable flange and said locking ring when said detachable flange is moved to said limit of its permissible axial movement away from said locking ring, is less than the radial thickness of that portion of the radially inwardly extending bead of the locking ring which engages the said annular groove.

8. A wheel having a rim to mount a pneumatic tire, one peripheral margin at one edge of said rim being reduced in diameter and having a circumferential groove at the bottom of said reduced diameter margin and spaced axially from the edge of said rim, said margin of reduced diameter extending cylindrically from the upper edge of the groove to the side of the rim and said rim being tapered radially outwardly and axially inwardly from the opposite side of the groove more distant from said edge, a detachable circumferential tire retaining flange mounted in said margin of reduced diameter in tire-retaining position and having its radially inner surface flared radially outwardly from said groove to the adjacent edge of the rim to form an annular space between the reduced diameter margin of said rim and said detachable flange, said space enlarging to the side of said rim, and a split locking ring to fit said groove and fit said annular space to lock said flange against outward axial displacement, said flange being movable axially away from said edge to enlarge the width of said annular space to provide a passage of insufficient radial width to permit said locking ring to expand outwardly to clear said groove but of sufficient width to permit withdrawal of said locking ring when said locking ring is twisted to an angle to its axis.

9. The wheel of claim 8 in which the inner periphery of said flange tapers radially outwardly in the opposite axial directions from said groove.

References Cited in the file of this patent

UNITED STATES PATENTS

| 1,808,403 | Brink | Oct. 4, 1932 |
| 1,908,281 | Brink | May 9, 1933 |
| 2,468,947 | Sinclair | May 3, 1949 |
| 2,651,348 | Monette | Sept. 8, 1953 |

FOREIGN PATENTS

| 741,853 | France | Dec. 20, 1932 |
| 443,322 | Great Britain | Feb. 26, 1936 |